Patented Aug. 26, 1952

2,608,555

UNITED STATES PATENT OFFICE 2,608,555

BASE CATALYZED POLYMERIZATIONS

Orville Horwitz Bullitt, Jr., Swarthmore, Pa., assignor to E. I. du Pont de Nemours & Company, Wilmington, Del., a corporation of Delaware No Drawing. Application July 3, 1948,
Serial No. 37,060

2 Claims. (Cl. 260—89.5)

This invention relates to a new process for the polymerization of monoethylenic compounds.

This invention has as an object an improvement in the polymerization of monoethylenic compounds. Other objects will appear hereinafter.

These objects are accomplished by the following invention wherein a polymerizable monoethylenic compound, i. e., a polymerizable compound having but one unsaturated carbon to carbon linkage of aliphatic character and that ethylenic, is polymerized by bringing the same in contact, at a temperature below 10° C. and above —120° C. in an anhydrous, inert medium, with a catalytic amount, 0.01 to 5% based on the weight of polymerizable monomer, of a salt, with an alkali forming metal, an acid having a $pK_a$ of at least 15 [Hammett, Physical Organic Chemistry, McGraw-Hill (1940), pages 48–50, 251–290]. The term $pK_a$ has been discussed and defined by Conant et al., J. Am. Chem. Soc. 54, 1212 (1932); McEwen, ibid, 58, 1124 (1936); Branch and Calvin—The Theory of Organic Chemistry (Prentice-Hall, 1936) pages 183–270.

In a preferred method of practicing this invention the polymerizable monoethylenic compound, such as methyl methacrylate or methacrylonitrile is rapidly agitated in liquid ammonia at a temperature of —90 to —33° C. in the presence of a small amount, such as 0.1 to 2%, of a strong base such as potassium amide or sodium amide. After a short time, such as from three minutes to three hours, the strong base is neutralized, e. g., with an acid such as ammonium chloride, and the solid polymer isolated by removal of the liquid ammonia and any monomer that may remain.

The following examples in which parts are by weight are illustrative of the invention.

Example I

A solution of 0.1 part of sodium in 410 parts of anhydrous liquid ammonia was stirred under nitrogen at —77° C. for five minutes, during which time the sodium was converted to sodamide, due to the catalytic effect of sodium oxides present. To this solution there was added with stirring over a period of about three minutes a total of 20 parts of methacrylonitrile. Polymerization occurred immediately on addition and the polymeric product precipitated. After fifteen minutes excess ammonium chloride was added and after stirring five minutes the polymer was removed by filtration on a Buchner funnel. The precipitate was then stirred in water, washed with ethanol, ethanol-hydrochloric acid mixture, ethanol, and ether, and dried in a vacuum. There was obtained 18.6 parts of polymeric methacrylonitrile which had a molecular weight of 83,000, as indicated by the viscosity of an 0.1% solution in dimethylformamide.

Example II

To a solution of 0.1 part of sodium in 410 parts of anhydrous liquid ammonia in which the sodium had been converted to sodium amide by addition of ferric nitrate, there was added, in two minutes with stirring at —77° C., a total of 23.5 parts of methyl methacrylate. Solid polymeric product separated and after ten minutes stirring the solid was removed by filtration on a Buchner funnel. The product was washed twice with 50% aqueous ethanol, then twice with 50% aqueous ethanol containing hydrogen chloride, then twice with 50% aqueous ethanol. The white, powdery polymer was dried in a vacuum and consisted of 21 parts of acetone-soluble product which had a molecular weight of 43,000, as determined by the method of Baxendale, Bywater, and Evans [J. Polymer Sci., I, 237 (1946)].

Example III

About ten parts of methacrylonitrile was dissolved in about 30 parts of trimethylamine and the solution cooled to —75° C. Addition of about two parts of a 5% solution of phenyllithium in ether resulted in rapid conversion to a yellow solid product in high yield. Similar results were obtained when acrylonitrile was substituted for methacrylonitrile in the above procedure.

Example IV

About 410 parts of liquid ammonia (distilled from sodium) was stirred under a nitrogen atmosphere at —77° C. while about 0.1 part of sodium was added. After 15 minutes the blue color was still present indicating that little sodium amide was formed. With stirring, a total of about 20 parts of methacrylonitrile was added in about two minutes. The blue color was discharged as soon as addition started and a brown solid polymer precipitated. The precipitate was washed as described in Example I. There was obtained seven parts of a polymer as a pale yellow powder which was soluble in dimethylformamide but insoluble in acetone.

Example V

To a vigorously stirred solution of 40 parts of dry acrylonitrile maintained at about 5° C. was added dropwise a saturated solution of sodium methoxide in methanol. After the addition of a few drops of the solution the temperature rose rapidly to 30° C. The reaction mixture was again cooled to 5° C. and a few more drops of the initiator solution added when a similar temperature rise was noted. About 0.5 part of sodium methoxide in about 2 parts of methanol was used in all. A large excess of ethanol and water was then added and the product was separated by filtration, washed in succession with alcohol, 6-N-hydrochloric acid solution, water, ethanol and diethyl ether. In this way six parts of a pale yellow powder was obtained which was soluble in dimethyl formamide to give a solution from which a clear film was obtained on casting by conventional methods. The polymer was insoluble in cyclohexanone and concentrated hydrochloric acid and had a molecular weight of about 4,000 (as determined from viscosity measurements on a 0.1% solution in dimethyl formamide).

*Example VI*

Acrylonitrile (80 parts) was stirred in a nitrogen atmosphere and cooled to −32° C. while one part of methanol saturated with sodium methoxide was added. Little change in temperature occurred for fifteen minutes, at the end of which time 0.5 part of the initiator solution was added which caused the temperature to rise to 0° C. in one minute. At the end of twenty minutes the reaction temperature had again fallen to −32° C. and 0.1 part of initiator solution was added raising the temperature to −17° C. The total time of the reaction was twenty-five minutes, at the end of which the mixture was treated with water and ethanol. The product was separated by filtration and washed with alcoholic hydrogen chloride, ethanol and diethyl ether. There was obtained 19.5 parts of a white powder from which a clear yellow film was obtained by heating at 190° C. under pressure. The molecular weight of the polymer was 17,000. A solution of the polymer in dimethyl formamide yields a clear pale yellow film.

*Example VII*

To a rapidly stirred dispersion of 80 parts of acrylonitrile in 300 parts of butane at −85° C. there was added 15 parts of an ether solution containing 1.5 parts of lithium diphenylamide. The addition of the initiator solution required seventy minutes during which the temperature of the reaction mixture was maintained between −85 and −70° C. At the end of the reaction period the polymeric product was recovered in the manner described in Example VI to give 42 parts of a pale green powder having a molecular weight of 78,000.

*Example VIII*

A dispersion of 40 parts of acrylonitrile in 100 parts of butane was stirred rapidly while 7 parts of an ether solution containing 0.7 part of phenyllithium was added during twenty minutes. The temperature was maintained between −68 and −72° C. When the product was isolated as described in Example VI a total of 3.5 parts of a pale yellow powder having a molecular weight of 23,000 was obtained.

*Example IX*

To about 1.4 parts of potassium amide in 572 parts of liquid ammonia in a 3-necked round bottom flask protected from moisture by a drying tube was added slowly with stirring, 130 parts of distilled acrylonitrile. A vigorous reaction occurred leaving a light yellow solid in the flask. Ammonium chloride was added to the mixture and excess water cautiously added to the flask. The solid was filtered, washed with water and finally with acetone. A 93% yield of polyacrylonitrile was obtained, light yellow in color with a molecular weight of 22,000.

If the mode of addition of monomer to base is reversed (potassium amide in liquid ammonia added to a liquid ammonia solution of acrylonitrile) polymerization still occurred although the quantity of base in this case was extremely small. Only catalytic amounts are required.

*Example X*

Styrene was polymerized in a manner similar to that described above using 0.0125 mole of potassium amide and 1 mole of styrene. A 91% yield of polystyrene (molecular weight 5100) was obtained.

In the process of this invention there is employed as the initiator for the polymerization of polymerizable monoethylenic compounds the salt, with an alkali forming metal, of an acid having a $pK_a$ of at least 15 (Hammett, pages 49–50) and generally less than 75, including not only the compounds listed in Hammett, Branch et al., Conant et al., and McEwen supra, but all such compounds so defined. The preferred initiators are the group IA metal salts of such acids, which include particularly the alkali metal alkoxides, aryls, and amides, e. g., sodium methoxide, potassium methoxide, sodium ethoxide, sodium tertiary-butoxide, phenyllithium, lithium ethylphenylamide, potassium amide, lithium diphenylamide, and indenyllithium. Other initiators include the salts, with alkali forming metals, i. e., group IA and group IIA metals, of alkanes, aralkanes, amines, nitriles, etc., e. g., ethylsodium, dianilinecalcium.

The strong bases used as initiators in this invention may be prepared in a variety of ways which are well described in the literature. One method of preparation of a base involves the synthesis of phenyllithium from bromobenzene and lithium metal, as described by Gilman, J. Am. Chem. Soc. 54, 1957 (1932). The phenyllithium made in this way is obtained in ether solution, which is suitable for use directly in the practice of this invention. By the addition of suitable amounts of acids stronger than benzene to this ether solution, a large number of initiator solutions may readily be prepared in a convenient form.

The temperature of the polymerization should be between 10° and −120° C., with a preferred range of from −30° to −90° C. At these lower temperatures polymers of higher degree of polymerization are obtained. The polymerization may be run in bulk or in inert solvents or diluents, such as ammonia, trimethylamine, and ether. Since initiators which are particularly effective in the practice of this invention are readily decomposed by water and other active hydrogen-containing materials, the presence of these substances in other than small amounts is to be avoided, particularly if high-molecular-weight products are desired; i. e., the polymerization is conducted essentially in the absence of more than 10%, based on the polymerizable monomer, of active hydrogen-containing materials which have a $pK_a$ of 30 to 15, and in the substantial absence of any material having a $pK_a$ less than that of the conjugate acid of the basic catalyst. If methanol or other alcohol is used as a solvent for the initiator, its concentration should be kept at a minimum, preferably below 10% based on the polymerizable monomer.

The alkali forming metal salt is present only in catalytic amounts, i. e., from 0.01 to 5%, and preferably from 0.1 to 2% based on the weight of polymerizable monomer. Smaller amounts may require longer periods of time for the polymerization, while larger amounts give low-molecular-weight products or insoluble or cross-linked polymers.

The time required for the polymerization is usually short, e. g., from one to thirty minutes, although longer times may be employed but are usually unnecessary.

The monomeric compounds subject to polymerization and copolymerization by the process of this invention consist solely of monoethylenic compounds which are liquid or soluble under the reaction conditions and which are polymerizable to macromolecular polymers by conventional techniques, such as by peroxygen catalysts. Particularly preferred are the polymerizable monoethylenic esters and nitriles, particularly those having a terminal methylene group, e. g., methyl methacrylate, ethyl acrylate, butyl methacrylate, methacrylonitrile, and vinyl acetate.

The ease of polymerization is generally dependent on the solvent for the polymerization system and the specific catalyst used. Optimum rates of polymerization of the polymerizable monoethylenic esters and nitriles are obtained in anhydrous liquid ammonia or a liquid amine, such as trimethylamine, system with sodium or potassium amide catalysts.

The polymeric products obtained by the process of this invention are useful in the preparation of fibers, films, and moldings. The products are high-molecular-weight solids which generally have a degree of polymerization of at least 50 and preferably 100 or more, as defined by Staudinger and cited by Marval and Horning in Gilman's "Organic Chemistry," 2nd Ed. (1943), vol. I, page 741.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the polymerization of a methacrylic ester, the improvement wherein the polymerization is effected by bringing said polymerizable compound in contact at a temperature within the range from $-30°$ C. to $-90°$ C. with the salt, with an alkali forming metal, of an acid of $pK_a$ of 15 to 75.

2. In the polymerization of methyl methacrylate, the improvement wherein the polymerization is effected by bringing said methyl methacrylate in contact at a temperature within the range from $-30°$ C. to $-90°$ C. with the salt, with an alkali forming metal, of an acid of $pK_a$ of 15 to 75.

ORVILLE HORWITZ BULLITT, JR.

REFERENCES CITED

The following references are of record in the file of this patent:

UNITED STATES PATENTS

| Number | Name | Date |
|---|---|---|
| 2,377,779 | Hanford | June 5, 1945 |
| 2,458,355 | Dickey | Jan. 4, 1949 |
| 2,475,424 | Dickey et al. | July 5, 1949 |
| 2,478,416 | Miller | Aug. 9, 1949 |

OTHER REFERENCES

Glasstone—Textbook of Physical Chemistry—2nd Ed., pages 974–975.

Wooster, 56 J. Am. Chem. Soc. 1134–1136, May 1934.